(No Model.)
C. W. BALDWIN.
BRAKE APPARATUS FOR ELEVATORS.
No. 358,322. Patented Feb. 22, 1887.
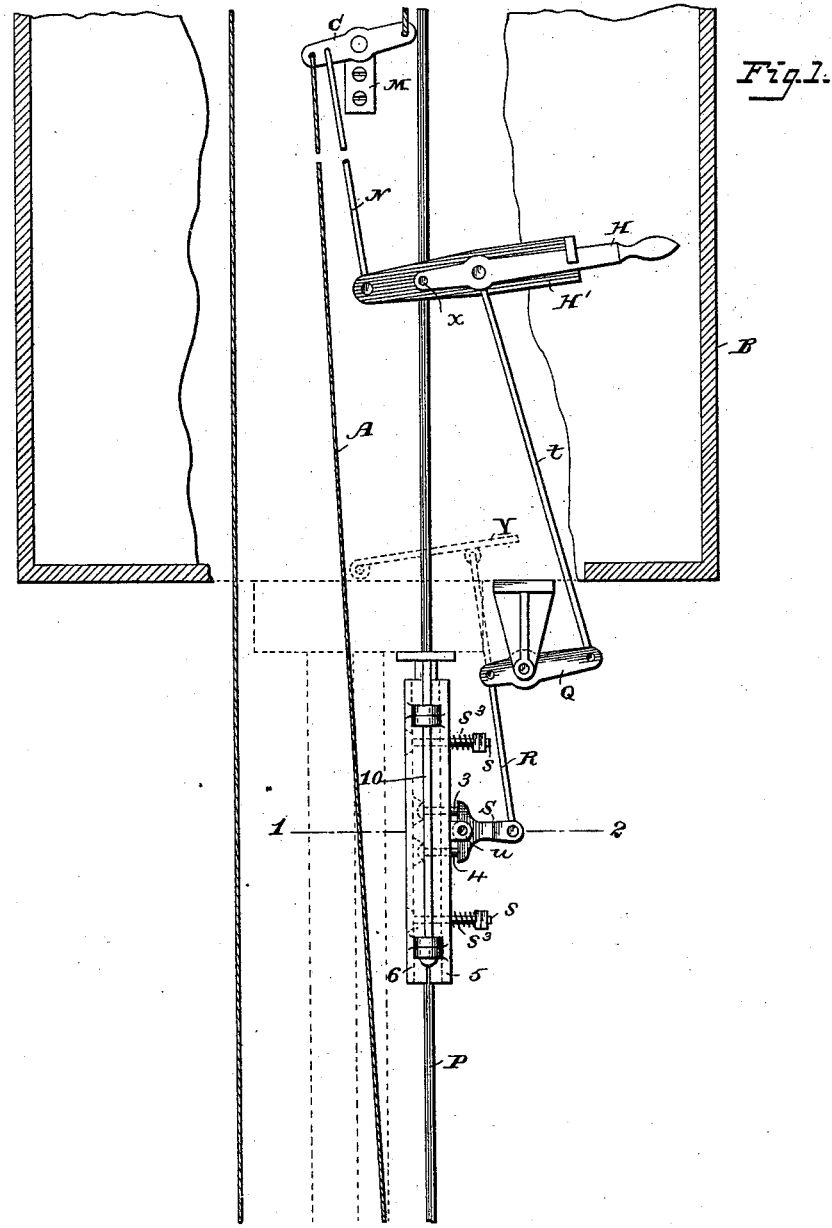
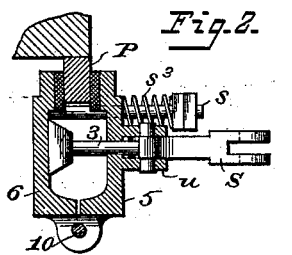

UNITED STATES PATENT OFFICE.

CYRUS W. BALDWIN, OF YONKERS, NEW YORK, ASSIGNOR TO THE HYDRAULIC ELEVATOR COMPANY, OF CHICAGO, ILLINOIS.

BRAKE APPARATUS FOR ELEVATORS.

SPECIFICATION forming part of Letters Patent No. 358,322, dated February 22, 1887.

Application filed July 9, 1886. Serial No. 207,581. (No model.)

*To all whom it may concern:*

Be it known that I, CYRUS W. BALDWIN, a citizen of the United States, and a resident of Yonkers, Westchester county, New York, have invented certain new and useful Improvements in Brake Apparatus for Elevators, of which the following is a specification.

My invention relates to that class of elevating apparatus in which a vertically-traveling cage is controlled by the adjustment of a stopping and starting apparatus—such as a valve, belt-shifter, &c.—by devices operated from within the cage; and my invention consists in the combination, with the cage, of a friction device and means for controlling it by the operator within the cage, either in connection with or independently of the means for adjusting the stopping and starting device.

In the drawings, Figure 1 is a sectional elevation illustrating sufficient of an elevator to show my improvement, part of the side of the cage being removed to show the position of the devices carried by the cage. Fig. 2 is a cross-sectional view through the friction device.

My invention is intended to be used with that class of elevators in which an attendant within the cage controls the position or operation of the stopping and starting device, and my invention can be used in this class of elevators with any of the various stopping and starting devices which are in common use, whether they be belt-shifters, valves, circuit-breakers, or other appliances, whereby the elevator-engine is either put in motion or arrested or thrown into or out of connection with the parts which directly move the cage.

B is the cage; A, the shifting-cable, which is operated from a hand device carried by the cage. As shown, the hand device is a lever, H', pivoted to the cage at $x$, and connected by a rod, N, to a lever, C, pivoted to the cage and connected with the shifting-cable, so that by moving the lever H' the cable may be contracted or slackened to move the stopping and starting device in a well-known manner.

In order to facilitate the arresting of the movement of the cage, and in some cases to hold it should the other supports become injured, I use a friction-clamp carried with the cage, and in most cases I prefer to employ connections whereby the clamp may be controlled by the operator in the act of controlling the cable A. The friction device consists of two clamp-jaws, 5 6, one or both of which may be movable, the device being carried below the bottom of the cage. The jaws are connected to the cage and to each other by a pintle-rod, 10, extending through ears on the jaws and hinging the jaws to each other. The jaws are arranged upon opposite sides of a rod, bar, or guide, P, which may be one of the usual guides, or an independent strip arranged at the side of the well, and springs $s^3$, coiled around both bolts $s$, secured to the jaw 6, and extending through openings in the jaw 5, bear upon the outer side of the jaw 5 and draw the jaws together forcibly, so that they will clamp the bar P tightly and hold the car and its load.

Any suitable devices may be employed by which the operator can separate or bring together the clamping-jaws. In the drawings I have shown a T-shaped lever, S, pivoted between lugs $u$ upon the jaw 5, its arms on opposite sides of its pivot bearing upon rods 3 4, and thus separate the jaws. The lever S is connected by a rod, R, to a lever, Q, hung to a bracket beneath the car, and the lever Q is connected by a rod, $t$, either to the hand-lever H' within the car, or to a supplemental lever, H, pivoted to the pivot $x$ of the lever H', so that the operator may swing both levers H H' together to operate the cable A and clamp simultaneously; or he may move the lever H independently of the lever H', so as to clamp or unclamp the jaws, regardless of the position of the cable A.

When the operator wishes the cage to move, he forces down the lever H, which swings the lever S, pulling on the jaw 5 and pushing against the jaw 6, thus overpowering the springs and opening the jaws. As the same movement operates the shifting-rope, the engine is started and the car will move up. To stop, the operator releases the lever H, when the springs will force the jaws against and clamp the guide until the frictional resistance will stop the car. It will be seen that whichever way lever H, and constituting with the latter a duplex operating device, is moved, it opens the jaws of the friction device and closes them when it is carried to a central position.

Other means for operating the friction-clamp may be used. For instance, a foot-lever, Y, (dotted lines, Fig. 1,) may be connected by a rod directly with the lever S.

It will be evident that the friction-clamp may be used when a shifting-bar or other shifting device is used to convey motion from the car to the stopping and starting device.

Without limiting myself to the precise construction and arrangement of parts shown, I claim—

1. The combination, with an elevator-cage and guide-bars, of a friction-clamp secured to the exterior of the cage, and consisting of pivoted spring-actuated jaws normally gripping the guide-bars, devices within the cage to control said jaws, and connections between said devices and jaws, whereby the latter are caused to clasp or to release the bars, substantially as described.

2. The combination of the cage, shifting device, friction-clamp, duplex operating device, and connections between the latter and the friction-clamp and the shifting device, whereby the adjustment of said operating device is also made the means of adjusting either the shifting device, the clamp, or both, substantially as described.

3. The combination, with an elevator-cage and guide-bars, of a friction-clamp secured to the exterior of the cage, and consisting of jaws hinged together and normally gripping the guide-bars, a lever connected to one of said jaws to separate the latter, a device within the cage, and connections, substantially as described, between the lever and said operating device, as and for the purpose set forth.

4. The combination of the hinged jaws 5 6, connected with an elevator-cage, a guide, P, arranged to be gripped by the jaws, springs forcing the jaws against the guide, and operating devices extending to the cage for opening the jaws, substantially as described.

5. The combination, with a guide and cage, of jaws carried by the cage, and springs bearing thereon to cause them to normally grip the guide, and jaw-actuating devices, whereby the jaws may be opened from within the cage, substantially as described.

6. The combination of the cage, jaws 5 6, springs forcing the jaws together, T-shaped lever S, pivoted to one of the jaws, and rods 3 4, extending from the head of the lever to the other jaw, substantially as described.

7. The combination of the hinged jaws, operating-lever, rods $s$, and springs $s^3$, substantially as described.

In testimony whereof I have signed my name to this specification in the presence of two subscribing witnesses.

CYRUS W. BALDWIN.

Witnesses:
W. H. SWENY,
JOHN C. HARRIGAN.